A. SUNDH.
MAGNETICALLY CONTROLLED FRICTION GEARING.
APPLICATION FILED OCT. 25, 1911.
1,025,547.
Patented May 7, 1912.
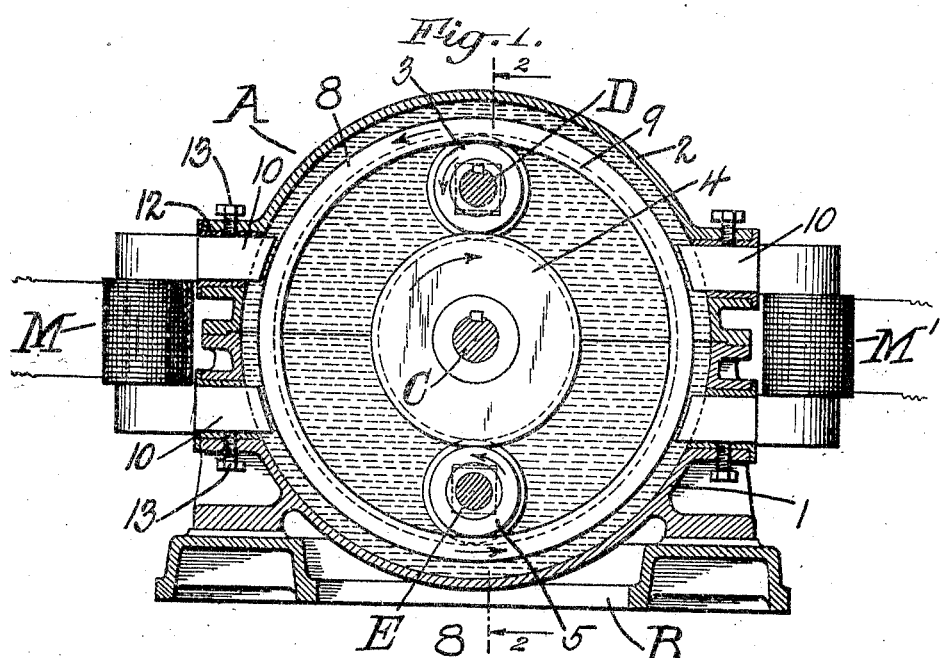
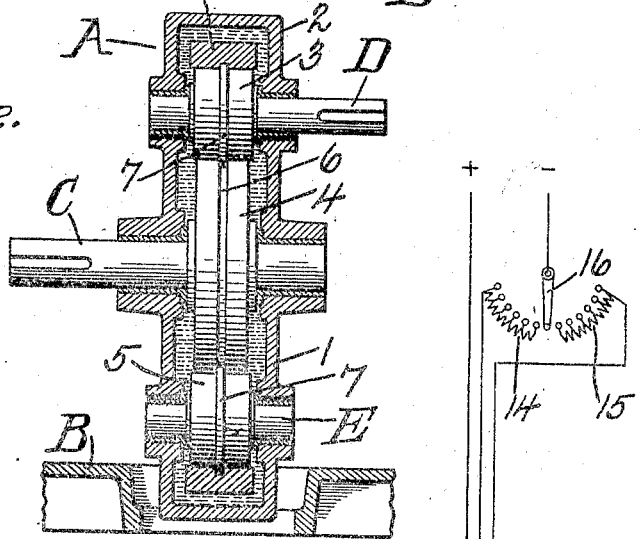
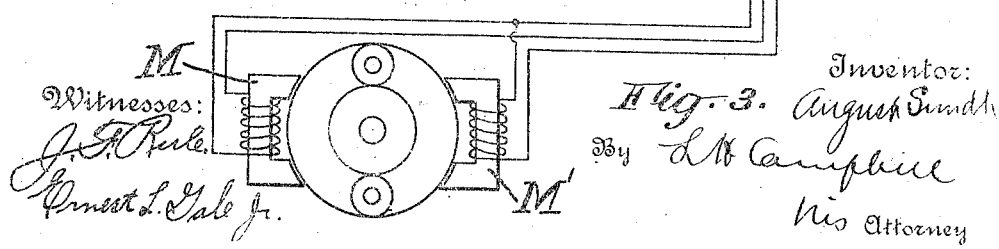
Inventor:
August Sundh
By L. W. Campbell
His Attorney
Witnesses:
J. F. Perle
Ernest L. Gale Jr.

UNITED STATES PATENT OFFICE.

AUGUST SUNDH, OF HASTINGS-ON-HUDSON, NEW YORK, ASSIGNOR TO OTIS ELEVATOR COMPANY, OF JERSEY CITY, NEW JERSEY, A CORPORATION OF NEW JERSEY.

MAGNETICALLY-CONTROLLED FRICTION-GEARING.

1,025,547.    Specification of Letters Patent.    Patented May 7, 1912.

Application filed October 25, 1911. Serial No. 656,614.

*To all whom it may concern:*

Be it known that I, AUGUST SUNDH, a citizen of the United States, residing at Hastings-on-Hudson, in the county of Westchester and State of New York, have invented a new and useful Improvement in Magnetically-Controlled Friction-Gearing, of which the following is a specification.

My invention relates to magnetically controlled friction gearing, and comprises a construction in which a plurality of friction gear wheels or rollers are surrounded by a friction driving ring, said rollers and ring being inclosed in a casing.

An object of the invention is to provide in connection with this form of gearing, electromagnetic means for holding the ring in proper frictional contact with the rollers, said means also serving to adjust the mechanism when the direction of rotation is reversed.

Other objects of the invention and the exact nature thereof will appear more fully hereinafter.

Referring to the accompanying drawings which illustrate an embodiment of my invention, Figure 1 is a sectional elevation view of the apparatus; Fig. 2 is a sectional elevation as indicated by the section line 2—2 in Fig. 1; Fig. 3 is a diagrammatic view showing the circuits for the electromagnets.

The friction gearing is preferably inclosed in an oil casing A mounted on a base B. The casing comprises a lower section 1 and an upper section 2 and is preferably filled with a light oil. A driving shaft D, which may be connected to any suitable source of power, as for example an electric motor, extends into or through the upper portion of the casing and is provided with suitable self adjustable bearings therein. Keyed to the shaft D is a friction driving roller 3 in friction rolling contact with a roller 4 keyed to a driven shaft C also journaled in the casing. Beneath the roller 4 is an idler roller 5 mounted on a shaft E self adjustable in the lower section of the casing. The roller 4 is provided with a peripheral groove 6 in which run annular ribs 7 formed on the rollers 3 and 5. This construction serves to prevent relative movement of the rollers in an axial direction. Surrounding the friction rollers is an annular friction gear or floating ring 8, the inner surface of which is in frictional contact with the peripheries of the rollers 3 and 5. The ring 8 is also provided with an annular recess 9 to receive the ribs 7, thereby holding the ring against lateral displacement. On opposite sides of the casing are electromagnets M and M', each comprising pole pieces 10 extending into the casing in close proximity to the gear ring 8. The latter is made of suitable magnetic material, such as iron or steel, so that when either of the magnets is energized, the magnetic circuit between the pole faces is completed through the gear ring. The casing A is preferably made of white metal or other suitable non-magnetic material. Sleeves 12 of brass or other non-magnetic material form bearings for the pole pieces 10 and also serve to magnetically insulate the casing A, in case the latter is made of cast iron or other magnetic material. The magnets are adjustable toward and from the ring 8 and are held in adjusted position by means of set screws 13. Only one of the magnets is energized at a time. The circuits for the magnets are shown diagrammatically in Fig. 3. A rheostat comprising resistances 14 and 15 is placed in circuit with the magnet windings. As the rheostat lever 16 is moved, for example, to the left, from the position shown, a circuit is established through the winding of the magnet M and the resistance 14. The amount of the resistance 14 in the magnet circuit, and consequently the strength of the magnet, is regulated by the position of the rheostat lever. A movement of the lever 16 to the right, in like manner establishes a circuit through the magnet M' and resistance 15.

In operation the shaft D may be rotated in either direction. If it is rotated in a counterclockwise direction for example, the friction wheels and ring will be rotated in the directions indicated by the arrows. The rotation of the friction wheel 3 rotates the gear 8 and also tends to carry it bodily to the left, thereby increasing the frictional pressure between the ring and rollers. When the drive shaft D is rotated in the direction indicated, the magnet M is energized. The magnetic pull on the ring 8 materially increases the pressure between the rollers and ring. In this way sufficient pressure is maintained to practically prevent slipping, thus securing an efficient transmission of power through the gearing. The strength of the magnet may be regulated at will to vary the pressure on the friction rollers, to suit varying conditions met with in practice. When it is desired to operate the mechanism in a reverse direction, the direction of rotation of the driving shaft is reversed, and the rheostat lever moved to the right to deënergize the magnet M and energize the magnet M'. The ring 8 will then be drawn toward the poles of the magnet M'. The ring 8 and the friction wheels are preferably so proportioned that only a slight lateral movement of the ring is permitted. The bearings for the shafts D and E are capable of a limited movement in the casing to permit a slight automatic adjustment of the rollers 3 caused by the variation in pressure or by wear or irregularities in the rollers.

Various modifications of the mechanism herein disclosed might be made without departing from my invention. I wish therefore not to be limited to the exact construction shown.

What I claim as new and desire to secure by Letters Patent of the United States is:—

1. The combination of rotatable members in rolling contact, an additional rotatable member and magnetic means acting on said additional member to cause pressure between said first-named members.

2. The combination of rotary friction gears in rolling contact, a ring surrounding said gears and electromagnetic means acting on said ring to govern the pressure at the contact surfaces of said gears.

3. In combination, friction rollers, an annular friction member surrounding said rollers, and electro-magnetic means to regulate the pressure between the said member and rollers.

4. The combination of a friction roller, a ring in rolling contact therewith, and a magnet, said ring comprising magnetic material forming an armature for the magnet.

5. The combination of a magnet and a ring of magnetic material rotatable relatively to the magnet with a section of the ring continually in position to form an armature for the magnet.

6. The combination of a magnet, a magnetic ring rotatable about an axis stationary with respect to the magnet, and means to rotate the ring with a section thereof constantly in position to form an armature for the magnet.

7. The combination of a magnet having spaced pole pieces, and a magnetic friction ring rotatable about an axis perpendicular to a line joining the pole pieces and with a section of the ring constantly in position to form a magnetic path between the pole pieces.

8. The combination of a floating magnetic ring, friction gears in rolling contact therewith, and a magnet positioned to exert a magnetic pull on said ring and thereby control the pressure between the ring and friction gears.

9. The combination of friction rollers, a magnetic ring surrounding the rollers, and a magnet having pole pieces in proximity to said ring and adjustable to vary the space between the ring and pole pieces.

10. In combination, friction rollers, a floating ring surrounding the rollers, a casing inclosing said ring and rollers, and a magnet having pole pieces extending through the walls of the casing into proximity to the rollers.

11. In combination, friction rollers, a floating ring surrounding the rollers, electro-magnets positioned to pull on said ring in opposite directions, and means for separately and singly energizing said electromagnets.

12. In combination, a friction driving roller rotatable in either direction, friction rollers coöperating therewith, a friction ring of magnetic material surrounding the rollers, electromagnets on opposite sides of said ring each having spaced pole pieces in position to include a section of the ring in the magnetic circuit, means to singly energize each magnet, and means to vary the strength of each magnet.

13. In combination, friction rollers, a friction ring of magnetic material surrounding the rollers, opposed electro-magnets, and a controller operable to connect each magnet separately and singly to a source of current supply and to regulate the strength of the exciting current.

14. In combination, a friction driving roller, a friction driven roller, and a friction idler roller having horizontal axes arranged in vertical alinement, a magnetic floating ring surrounding said rollers, a casing inclosing the ring and rollers, electro-magnets on opposite sides of said ring, and means to separately excite the electromagnets.

15. In combination, a drive shaft rotatable in opposite directions, a friction roller carried thereby, coöperating friction rollers, a floating ring surrounding the rollers, and means to shift the ring in either direction to correspond to the direction in which the drive shaft is rotated.

16. In combination, a friction driving roller, coöperating rollers, a floating ring surrounding the rollers and electromagnetic means to shift the ring in opposite directions to correspond with the direction of rotation of said driving shaft.

In testimony whereof, I have signed my name to this specification in the presence of two subscribing witnesses.

AUGUST SUNDH.

Witnesses:
 JAMES G. BETHELL,
 J. F. RULE.